US012811150B2

(12) United States Patent
Katayama et al.

(10) Patent No.: US 12,811,150 B2
(45) Date of Patent: Nov. 24, 2026

(54) METHOD FOR MANUFACTURING POSITIVE ELECTRODE MIXTURE FOR FLAT LITHIUM PRIMARY BATTERY AND FLAT LITHIUM PRIMARY BATTERY

(71) Applicant: Panasonic Intellectual Property Management Co., Ltd., Osaka (JP)

(72) Inventors: Takafumi Katayama, Osaka (JP); Touta Mizuta, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 574 days.

(21) Appl. No.: 18/548,917

(22) PCT Filed: Feb. 10, 2022

(86) PCT No.: PCT/JP2022/005379
§ 371 (c)(1),
(2) Date: Sep. 4, 2023

(87) PCT Pub. No.: WO2022/196201
PCT Pub. Date: Sep. 22, 2022

(65) Prior Publication Data
US 2024/0145716 A1 May 2, 2024

(30) Foreign Application Priority Data
Mar. 17, 2021 (JP) ................................ 2021-043676

(51) Int. Cl.
*H01M 4/62* (2006.01)
*H01M 4/02* (2006.01)
(Continued)

(52) U.S. Cl.
CPC ............... *H01M 4/62* (2013.01); *H01M 4/50* (2013.01); *H01M 6/14* (2013.01); *H01M 2004/021* (2013.01); *H01M 2004/028* (2013.01)

(58) Field of Classification Search
CPC ............ H01M 4/62; H01M 4/50; H01M 6/14; H01M 2004/021; H01M 2004/028
See application file for complete search history.

(56) References Cited

U.S. PATENT DOCUMENTS

2015/0303481 A1* 10/2015 Duong .................. H01M 4/625 241/5
2016/0344039 A1* 11/2016 Sano ..................... H01M 4/366

FOREIGN PATENT DOCUMENTS

JP S55-049862 A 4/1980
JP S62-271351 A 11/1987
(Continued)

OTHER PUBLICATIONS

Machine Translation of JP-2019164965-A (Jun. 3, 2026) (Year: 2026).*
(Continued)

*Primary Examiner* — Matthew J Merkling
(74) *Attorney, Agent, or Firm* — WHDA, LLP

(57) ABSTRACT

Disclosed is a flat lithium primary battery including a case, a positive electrode, a negative electrode, a separator, and a nonaqueous electrolyte, in which the positive electrode, the negative electrode, the separator, and the nonaqueous electrolyte are disposed in the case. The positive electrode includes: a positive electrode active material; and a fluorocarbon resin with swellability in the nonaqueous electrolyte. In the positive electrode, the fluorocarbon resin is present in particulate form. When, on the flat lithium primary battery having been put in an environment with a temperature of 25° C., a high temperature storage test to store the flat lithium primary battery in an environment with a temperature of 125° C. for 100 hours is conducted, the ratio d2/d1 of a particle diameter d2 of the fluorocarbon resin after the high temperature storage test to a particle diameter d1 of the fluorocarbon resin before the high temperature storage test is 1.5 or higher and 3.1 or lower.

6 Claims, 1 Drawing Sheet

(51) Int. Cl.
*H01M 4/50* (2010.01)
*H01M 6/14* (2006.01)

(56) References Cited

FOREIGN PATENT DOCUMENTS

| | | | | |
|---|---|---|---|---|
| JP | 08-106903 | | | 4/1996 |
| JP | 2005-310658 | A | | 11/2005 |
| JP | 2010-040334 | A | | 2/2010 |
| JP | 2010-262864 | A | | 11/2010 |
| JP | 5362436 | B2 | * | 12/2013 |
| JP | 2019164965 | A | * | 9/2019 |

OTHER PUBLICATIONS

Machine Translation of JP-5362436-B2 (Jun. 3, 2026) (Year: 2026).*
International Search Report of PCT application No. PCT/JP2022/005379 dated Apr. 19, 2022.
Extended European Search Report dated Apr. 22, 2025, issued in counterpart Application No. 22770960.7. (9 pages).

* cited by examiner

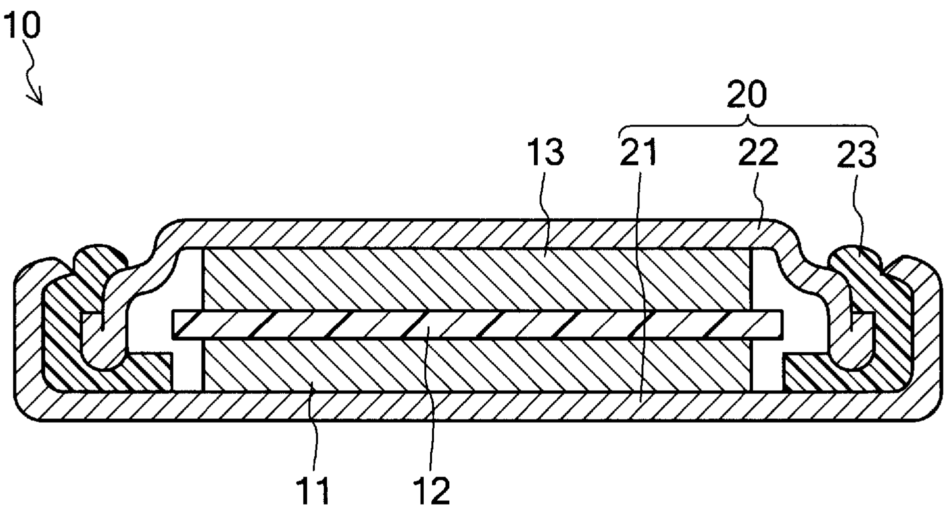
10
20
13
21
22
23
11
12

METHOD FOR MANUFACTURING POSITIVE ELECTRODE MIXTURE FOR FLAT LITHIUM PRIMARY BATTERY AND FLAT LITHIUM PRIMARY BATTERY

CROSS-REFERENCE TO RELATED APPLICATIONS

This application is a U.S. national stage application of the PCT International Application No. PCT/JP2022/005379 filed on Feb. 10, 2022, which claims the benefit of foreign priority of Japanese patent application No. 2021-043676 filed on Mar. 17, 2021, the contents all of which are incorporated herein by reference.

BACKGROUND

Technical Field

The present invention relates to a method for manufacturing a positive electrode mixture for a flat lithium primary battery and the flat lithium primary battery.

Description of the Related Art

Flat lithium primary batteries have the characteristics of high energy density and high voltage. Therefore, flat lithium primary batteries have been conventionally used as power sources for various electronic devices.

Various types of flat lithium primary batteries have been proposed. For example, Patent Literature 1 discloses a lithium battery using lithium as a negative electrode active material, in which manganese dioxide is used as a positive electrode active material and using a mixture of carbon black and graphite is used as a conductive agent. A positive electrode of the lithium battery is produced in such a manner that the conductive agent is added to manganese dioxide serving as the positive electrode active material and furthermore a binder (for example, polytetrafluoroethylene or polyvinylidene fluoride) is added thereto and mixed as necessary to prepare a positive electrode mixture, and the positive electrode mixture is subjected to, for example, pressing to form a sheet of the positive electrode mixture.

CITATION LIST

Patent Literature 1: Japanese Unexamined Patent Application Publication No. H08-106903

SUMMARY

In recent years, nonaqueous electrolyte batteries have been used in an environment with high temperature. For example, lithium primary batteries have been used as power sources for sensors of tire pressure monitoring systems (TPMS). In this case, the temperature of the batteries sometimes reaches 100° C. or higher (for example, 125° C. or higher). When a nonaqueous electrolyte battery is used at such high temperature, a case of the battery sometimes expands due to gas generated inside the case of the battery. Likewise, also when a nonaqueous electrolyte battery is stored at such high temperature, the case of the battery sometimes expands.

When a case of a battery expands as described above, the electrical connection between constituents of the battery becomes insufficient, whereby the characteristics of the battery sometimes deteriorate. For example, the resistance between a positive electrode and a positive electrode case (or a current collector) increases, whereby the characteristics of the battery sometimes deteriorate.

As a result of extensive studies by the inventors, the inventors found that, by adding a specific polymer to a positive electrode, a flat lithium primary battery capable of maintaining high characteristics even at high temperatures can be obtained. The present invention is based on this new finding.

In view of the above-described circumstances, one aspect of the present invention relates to a method for manufacturing a positive electrode mixture for a flat lithium primary battery, the method including the step of obtaining the positive electrode mixture by mixing a material including particles of a fluorocarbon resin with swellability in an electrolyte and particles of a positive electrode active material, in which the fluorocarbon resin has an average particle diameter in a range of 10 to 200 and, in the material, the content of the fluorocarbon resin is 0.2 to 6 parts by mass with respect to 100 parts by mass of the positive electrode active material, and the fluorocarbon resin is present in particulate form in the positive electrode mixture.

Another aspect of the present invention relates to a flat lithium primary battery, the flat lithium primary battery including a case, a positive electrode, a negative electrode, a separator, and a nonaqueous electrolyte, in which the positive electrode, the negative electrode, the separator, and the nonaqueous electrolyte are disposed inside the case; the positive electrode includes a positive electrode active material and a fluorocarbon resin with swellability in the nonaqueous electrolyte; the fluorocarbon resin is present in particulate form in the positive electrode; and, when the flat lithium primary battery having been put in an environment with a temperature of 25° C. is subjected to a high temperature storage test to store the flat lithium primary battery in a in an environment with a temperature of 125° C. for 100 hours, the ratio d2/d1 of a particle diameter d2 of the fluorocarbon resin after the high temperature storage test to a particle diameter d1 of the fluorocarbon resin before the high temperature storage test is 1.5 or higher and 3.1 or lower.

According to the present invention, the flat lithium primary battery capable of maintaining high characteristics even at high temperatures can be obtained.

BRIEF DESCRIPTION OF THE DRAWINGS

FIG. 1 is a cross-sectional schematic diagram of a configuration example of a lithium primary battery according to one embodiment of the present invention.

DETAILED DESCRIPTIONS

Hereinafter, an embodiment of the present invention will be described. Note that, hereinafter, the embodiment of the present invention will be described using an example, but the present invention is not limited to the example described below. In the following description, specific numerical values and materials are sometimes mentioned, but as long as the effects of the present invention are achieved, other numerical values and materials may be applied.

A flat lithium primary battery according to the present invention is realized, for example, by using a positive electrode mixture for a flat lithium primary battery, the mixture being manufactured by a method described below. Hereinafter, "the positive electrode mixture for the flat lithium primary battery" is sometimes simply referred to as "the positive electrode mixture." Furthermore, "the flat lithium primary battery" is sometimes simply referred to as "the lithium primary battery."

(Method for Manufacturing Positive Electrode Mixture for Flat Lithium Primary Battery)

A method for manufacturing a positive electrode mixture for a flat lithium primary battery according to one embodiment of the present invention includes the step of obtaining the positive electrode mixture by mixing a material including particles of a fluorocarbon resin with swellability in an electrolyte and particles of a positive electrode active material. At the step of obtaining the positive electrode mixture, the average particle diameter of the fluorocarbon resin is in a range of 10 to 200 μm, and the content of the fluorocarbon resin is in a range of 0.2 to 6 parts by mass with respect to 100 parts by mass of the positive electrode active material. At the step of obtaining the positive electrode mixture, the fluorocarbon resin is present in particulate form in the positive electrode mixture.

In the positive electrode mixture obtained by the above-described manufacturing method, the fluorocarbon resin is dispersed in particulate form. When a positive electrode for a flat lithium primary battery (hereinafter, sometimes simply referred to as "the positive electrode") is obtained using the above-described positive electrode mixture, a lithium primary battery capable of maintain high characteristics even at high temperatures can be realized.

Fluorocarbon resin is usually used as a binder (a binding agent) for maintaining the binding of particles of a positive electrode active material in a positive electrode. However, in the present embodiment, the swellability of fluorocarbon resin in an electrolyte is utilized. The fluorocarbon resin with swellability in the electrolyte may also serve as the binder or may not function as the binder. Here, "the fluorocarbon resin with swellability in the electrolyte" means that, when particles of the fluorocarbon resin are immersed in the electrolyte for a certain period of time, the diameter of the particles increases. In particular, a specific type of fluorocarbon resin has a high degree of swellability in the electrolyte at high temperatures (for example, at 60° C. or higher), and furthermore has a very high degree of swellability in the electrolyte at higher temperatures (for example, at 100° C. or higher). Furthermore, the fluorocarbon resin having swollen once in an environment with high temperature maintains a swollen state (a large particle diameter) even when the temperature reaches room temperature.

When the fluorocarbon resin is used as the binder, a positive electrode is usually manufactured in such a manner that a positive electrode mixture obtained by mixing particles of the fluorocarbon resin and particles of a positive electrode active material with a liquid is molded into the form of a disk-shaped pellet, and subsequently, the pellet is dried to remove the liquid therefrom. As the liquid, a solvent in which the fluorocarbon resin such as N-methyl-2-pyrrolidone (NMP) can be dissolved is used. Alternatively, the fluorocarbon resin having an average particle diameter (for example, 1 μm or smaller) sufficiently smaller than the average particle diameter of the positive electrode active material is used. In these cases, in the positive electrode, the fluorocarbon resin adheres to or is precipitated on so as to cover the surfaces of the particles of the positive electrode active material. In contrast, in the present embodiment, the fluorocarbon resin is dispersed in the form of particles having an average particle diameter of 10 μm or larger, in the positive electrode.

Note that, hereinafter, unless otherwise specified, fluorocarbon resin means a fluorocarbon resin with swellability in an electrolyte, and, in the case of mentioning a fluorocarbon resin without swellability, this will be specified.

The fluorocarbon resin included in the positive electrode including the positive electrode mixture manufactured by the method according to the present embodiment is in particulate form and is in point contact with at the surfaces of particles of a positive electrode active material. Under circumstances where case of the battery expands due to gas generated at high temperatures, the fluorocarbon resin absorbs an electrolyte, thereby swelling, and as a result, the particle diameter of the fluorocarbon resin is increased. Thus, with the expansion of the case, the positive electrode expands, so that close adhesion between the case and the positive electrode is maintained. On the other hand, the particles of the positive electrode active material have a large surface area and detailed projections and recesses, and therefore, when the positive electrode expands, particles of the fluorocarbon resin have a larger particle diameter while being engaged with the projections and recesses of the positive electrode active material. When the fluorocarbon resin expands while being engaged with the projections and recesses of the positive electrode active material, the whole of the positive electrode expands uniformly, and the positive electrode expands while maintaining an electrical conduction path between the positive electrode active materials. As a result, even when the case expands at high temperatures, the electrical connection between the case and the positive electrode is maintained, whereby high characteristics are maintained.

At the step of obtaining the positive electrode mixture, the average particle diameter of the particles of the fluorocarbon resin to be mixed with the particles of the positive electrode active material is in a range of 10 to 200 μm. When the average particle diameter of the particles of the fluorocarbon resin is 10 μm or larger, the particles of the fluorocarbon resin swell at high temperatures, whereby the electrical connection between the case and the positive electrode is maintained to achieve the effect of maintaining high battery characteristics. On the other hand, a larger particle diameter of the fluorocarbon resin causes less contact points (engagement points) between the fluorocarbon resin and the positive electrode active material, and hence the fluorocarbon resin easily expands specifically independently, and the electrical conduction path between the positive electrode active materials is more easily cut. However, when the average particle diameter of the particles of the fluorocarbon resin is 200 μm or smaller, the swelling of the particles of the fluorocarbon resin causes the positive electrode to more easily expand while the electrical conduction path between the positive electrode active materials is maintained.

From the viewpoints of allowing the positive electrode to expand while maintaining the electrical conduction path between the positive electrode active materials and increasing the effect of maintaining the electrical connection between the case and the positive electrode, the average particle diameter of the particles of the fluorocarbon resin at the step of obtaining the positive electrode mixture is preferably 30 μm or larger and more preferably 70 μm or larger. From the viewpoint of easily maintaining the electrical conduction path between the positive electrode active materials when the positive electrode expands, the average particle diameter of the particles of the fluorocarbon resin at the step of obtaining the positive electrode mixture is preferably 140 μm or smaller.

The average particle diameter of the particles of the fluorocarbon resin at the step of obtaining the positive electrode mixture is preferably in a range of 30 to 200 μm, and more preferably in a range of 70 to 200 μm or 70 to 140 μm.

Note that the average particle diameter of the particles of the fluorocarbon resin in the manufacture of the positive electrode mixture means a median diameter D50 on a volume basis and is measured by a laser diffraction particle size distribution measurement device.

The fluorocarbon resin may be a polymer having a vinylidene fluoride unit. When the polymer having the vinylidene fluoride unit is included in particulate form in the positive electrode mixture, higher effects can be achieved. Examples of the polymer having the vinylidene fluoride unit include a copolymer of vinylidene fluoride and another monomer. Examples of the other monomer include hexafluoropropylene (HFP) and tetrafluoroethylene (TFE). The vinylidene fluoride unit accounts for preferably 50 to 100 mol %, and more preferably 75 to 100 mol % of all the monomer units.

Examples of the fluorocarbon resin having the vinylidene fluoride unit include polyvinylidene fluoride (PVDF) and modified products thereof, a vinylidenefluoride-hexafluoropropylene copolymer, a vinylidenefluoride-chlorotrifluoroethylene copolymer, and a vinylidenefluoride-pentafluoropropylene copolymer.

The fluorocarbon resin is most preferably polyvinylidene fluoride (PVDF). Polyvinylidene fluoride (PVDF) has a high degree of swellability, and, when polyvinylidene fluoride is added as the particles of the fluorocarbon resin to the particles of the positive electrode active material, particularly high effects can be achieved.

The swellability of the fluorocarbon resin in the electrolyte is evaluated, for example, by the following method.

First, using the fluorocarbon resin, a film having a thickness of 1.5 mm (a density of 1.78 g/cm 3) is formed, and the film is immersed in a 60° C. electrolyte for 24 hours or longer. Subsequently, a mass W1 of the film before the immersion and a mass W2 of the film after the immersion are compared to evaluate the swellability. The rate of swelling is expressed as Swelling Rate (%)=100×(W2−W0/W1. The fluorocarbon resin preferably has a swelling rate of 20% or higher (in a range of 30% to 50%).

The content of the fluorocarbon resin with swellability in the positive electrode mixture is in a range of 0.2 to 6 parts by mass with respect to 100 parts by mass of the positive electrode active material, and may be in a range of 0.4 to 4 parts by mass (for example, 1 to 4 parts by mass or 2 to 3 parts by mass) with respect to 100 parts by mass of the positive electrode active material.

The weight average molecular weight (the mass average molecular weight) of the fluorocarbon resin may be in a range of 100,000 to 1,500,000, for example. Note that the weight average molecular weight of the fluorocarbon resin can be measured, for example, by gel permeation chromatography (GPC). The weight average molecular weight may be in a range of 400,000 to 1,500,000 (for example, in a range of 500,000 to 1,500,000, a range of 800,000 to 1,200,000, or a range of 1,000,000 to 1,200,000).

The mixture of the particles of the fluorocarbon resin and the particles of the positive electrode active material is, for example, molded into the form of a disk-shaped pellet by pressing or the like, whereby a positive electrode for a flat lithium primary battery (hereinafter, sometimes simply referred to as "the positive electrode" is obtained. To perform the molding more easily, the particles of the fluorocarbon resin, the particles of the positive electrode active material, and a liquid may be mixed to obtain the positive electrode mixture. That is, a material of the positive electrode mixture may include the liquid. After the molding, at least a part of the liquid may be evaporated as needed to obtain the positive electrode. As the liquid, there is used a liquid that does not allow the fluorocarbon resin to be dissolved therein (the fluorocarbon resin has a low degree of swellability in the liquid). The liquid is, for example, water.

The positive electrode active material typically includes only manganese dioxide. Therefore, in a typical example, "the positive electrode active material" in the present specification can be read as "manganese dioxide".

In the positive electrode active material, the ratio A/B of a BET specific surface area A ($m^2/g$) to an average particle diameter B (μm) may be in a range of 0.25 to 1.5. The BET specific surface area A ($m^2/g$) is measured by a BET method. A gas to be used in the BET method is nitrogen gas. The average particle diameter B (μm) means a median diameter D50 on a volume basis and is measured by a laser diffraction particle size distribution measurement device. When the ratio A/B is in the above-mentioned range, the specific surface area of the positive electrode active material is moderately large, and moderate projections and recesses are present in the surface of the positive electrode active material. Therefore, in the case where the positive electrode easily expands while maintaining the electrical conduction path between the positive electrode active materials and the case expands at high temperatures, the electrical connection between the case and the positive electrode can be maintained and high battery characteristics can be easily maintained.

In another aspect, the present invention provides a positive electrode mixture and a positive electrode using the positive electrode mixture. The positive electrode mixture and the positive electrode using the positive electrode mixture each include particles of a fluorocarbon resin with swellability in an electrolyte and particles of a positive electrode active material, in which the average particle diameter of the fluorocarbon resin is in a range of 10 to 200 μm, and the content of the fluorocarbon resin is in a range of 0.2 to 6 parts by mass with respect to 100 parts by mass of the positive electrode active material. The positive electrode mixture can be manufactured by the above-described manufacturing method according to the present embodiment, and therefore, matters described in the manufacturing method according to the present embodiment can be applied to the positive electrode mixture and the positive electrode. Therefore, duplicate descriptions will be omitted.

In another aspect, the present invention provides a method for manufacturing a positive electrode. The method for manufacturing the positive electrode according to one embodiment of the present invention includes: the step of obtaining a positive electrode mixture; and the step of forming the positive electrode by using the obtained positive electrode mixture. The step of obtaining the positive electrode mixture is described above, and therefore, duplicate descriptions thereof will be omitted. The step of forming the positive electrode is not particularly limited, and a well-known method may be used. For example, the positive electrode mixture may be molded into the form of a disk-shaped pellet, and then the pellet may be dried as needed to form the positive electrode.

(Flat Lithium Primary Battery)

A flat lithium primary battery according to one embodiment of the present invention includes a case, a positive electrode, a negative electrode, a separator, and a nonaqueous electrolyte, in which the positive electrode, the negative electrode, the separator, and the nonaqueous electrolyte are disposed inside the case. The positive electrode and the negative electrode face each other across the separator. The positive electrode includes: a positive electrode active material; and a fluorocarbon resin with swellability in the nonaqueous electrolyte. In the positive electrode, the fluorocarbon resin is present in particulate form. The positive electrode can be formed using the positive electrode mixture according to the present embodiment. Therefore, matters described on the positive electrode mixture can be applied to the positive electrode of the battery according to the present embodiment. For example, the average particle diameter of the particles of the fluorocarbon resin and the ratio of the positive electrode active material to the fluorocarbon resin can be in their above-described respective ranges. However, the ranges sometimes change in accordance with a change with passage of time or the temperature of an ambient environment. For example, the average particle diameter of the particles of the fluorocarbon resin may be larger in accordance with a change with passage of time or the temperature of an ambient environment.

The flat lithium primary battery is such that, when the flat lithium primary battery having been put in an environment with a temperature of 25° C. is subjected to a high temperature storage test to be stored in an environment with a temperature of 125° C. for 100 hours, the ratio d2/d1 of a particle diameter d2 of the fluorocarbon resin after the high temperature storage test to a particle diameter d1 of the fluorocarbon resin before the high temperature storage test is 1.5 or higher and 3.1 or lower. The lithium primary battery satisfying the above-mentioned condition can maintain high characteristics even at high temperatures.

The high temperature storage test can be performed under the following conditions. First, the battery as a measurement target is put in the state before the high temperature storage test. Specifically, the battery is put in an environment with a temperature of 25° C. for 2 hours. Next, the high temperature storage test is started. Specifically, the battery is moved to an environment with a temperature of 125° C. (for example, to an air atmosphere in a thermostatic oven set at 125° C.) and left standing in the above-mentioned environment for 100 hours. The high temperature storage test can be thus performed.

In the lithium primary battery, the particle diameter of the fluorocarbon resin in the positive electrode before the high temperature storage test is expressed as d1. From no expansion of the case, it is inferred that the lithium primary battery has not undergone the intentional environment with high temperature. Hence, the particle diameter d1 at that time can be regarded as the particle diameter before the high temperature storage test.

When the lithium primary battery is put in an environment with high temperature, the fluorocarbon resin absorbs the electrolyte and the particle diameter thereof is increased, as described above. The particle diameter of the fluorocarbon resin after the high temperature storage test is expressed as d2 (d2>d1). When the ratio d2/d1 is 1.5 or higher and 3.1 or lower, the particles of the fluorocarbon resin moderately swell in an environment with high temperature, whereby the battery characteristics are substantially prevented from decreasing at high temperatures.

Note that, when the flat lithium primary battery according to one embodiment of the present invention is put in a high-temperature atmosphere (for example, at 125° C. or higher) for many hours, the particles of the fluorocarbon resin in the positive electrode swell. Then, the particle diameter of the particles of the fluorocarbon resin having swollen once does not return to the original particle diameter even when the temperature of the battery decreases. Hence, even in the case of the battery including the positive electrode mixture according to the present embodiment, when the battery is subjected to the high temperature storage test (storage at 125° C. of higher for 100 hours) after put in an environment with high temperature (for example, 125° C. or higher) for many hours, sometimes the ratio d2/d1 is not in a range of 1.5 or higher and 3.1 or lower. In other words, the fact that the ratio d2/d1 is deviated from the range of 1.5 or higher and 3.1 or lower does not necessarily mean that the positive electrode mixture according to the present embodiment is not used. However, a flat lithium primary battery has a ratio d2/d1 of 1.5 or higher and 3.1 or lower can be regarded as the flat lithium primary battery according to one embodiment of the present invention. For example, when the battery using the positive electrode mixture of the present embodiment is not subjected to intentional heating after the production of the battery and before the high temperature storage test, the ratio d2/d1 can be considered to be approximately 1.5 or higher and 3.1 or lower. For example, when the temperature of the battery using the positive electrode mixture of the present embodiment is maintained at 35° C. or lower after the production and before the above-described high temperature storage test and the high temperature storage test was performed within 12 months after the production of the battery, the ratio d2/d1 can be considered to be approximately 1.5 or higher and 3.1 or lower.

The ratio d2/d1 is preferably 1.5 or higher and 2.4 or lower, and more preferably 1.7 or higher and 2.0 or lower. When the ratio d2/d1 is in the above-mentioned range, the effect of preventing a decrease in battery characteristics at high temperatures is remarkably achieved. As the fluorocarbon resin, a fluorocarbon resin described above in the method for manufacturing the positive electrode mixture can be used.

The positive electrode includes the positive electrode active material. In the positive electrode active material, the ratio A/B of a BET specific surface area A ($m^2/g$) to an average particle diameter B (μm) may be 0.25 to 1.5.

The average particle diameter of the positive electrode active material and the particle diameters d1 and d2 of the fluorocarbon resin are determined by analyzing the cross-section of the positive electrode or the powder of the positive electrode mixture by an electron probe micro analyzer (EPMA) or microscopic Raman spectroscopy. From grain boundaries of the particles of the positive electrode active material and the particles of the fluorocarbon resin, an area of a region occupied by the particles in the cross-section is determined, and the diameter of a circle (an equivalent circle) having the same area as the area determined above is regarded as the particle diameter of the particles. The particle diameters of a plurality of particles (for example, ten or more particles) are determined, and the averages of the determined particle diameters are regarded as the average particle diameter of the positive electrode active material and the particle diameters d1 and d2 of the fluorocarbon resin, respectively.

The nonaqueous electrolyte may include dimethoxy ethane (DME) as a solvent. In this case, the dimethoxy ethane may account for 50% by volume or higher of all solvents contained in the nonaqueous electrolyte. Dimethoxy ethane has a small specific gravity, and hence, with the same weight, the electrolyte accounts for a larger volume. Thus, the amount of the electrolyte in which the fluorocarbon resin swells can be increased, which substantially prevents a decrease in battery characteristics at high temperatures.

The shape of the case of the lithium primary battery (that is, the shape of the battery) is flat as a whole. The case may have, for example, a flat prismatic shape or a coin shape (including a button shape). When the lithium primary battery of the present embodiment is a coin-type lithium primary battery using a coin-shaped case, the positive electrode and the negative electrode each typically has a disk shape.

The case may include: a positive electrode case configured to function as a positive electrode terminal; a sealing plate configured to function as a negative electrode terminal; and a gasket disposed between the positive electrode case and the sealing plate. The gasket may include polyphenylene sulfide (for example, the polyphenylene sulfide content is 50% by mass or higher) or may be made of polyphenylene sulfide.

A material of the gasket is not particularly limited, and a material that is commonly used for gaskets can be used. Examples of the material of the gasket include resins, such as polypropylene (PP), polyphenylene sulfide (PPS), perfluoroalkoxy alkane (PFA), and polyetheretherketone (PEEK). Among them, PPS has the characteristic of high heat resistance and high rigidity. Therefore, PPS is preferred as a material of the gasket on the occasion of using the lithium primary battery at high temperatures. On the other hand, when the gasket including PPS is used, the internal pressure of the case sometimes easily increases when the lithium primary battery is used at high temperatures. Therefore, when the gasket including PPS and the positive electrode according to the present embodiment are used, a lithium primary battery leading to a particularly small decrease in the characteristics at high temperatures is achieved.

To prevent the expansion of the case due to the use of the battery at high temperatures, the thickness of the case may be increased. However, there is a problem of difficulty in molding a thick case. Therefore, it is difficult to avoid a certain level of expansion on the case. According to the present embodiment, high characteristics can be maintained even when the case expands.

The characteristics of the lithium primary battery according to the present embodiment are not easily deteriorated, and therefore the lithium primary battery can be preferably put to use in an environment with high temperature. The lithium primary battery may be a coin-type battery to be installed in a tire. As a system for monitoring a tire air pressure or the like in a vehicle, a tire pressure monitoring system (TPMS) and a tire monitoring system (TMS) have been known. In one example of the TPMS, a sensor for detecting the air pressure and the like of a tire is attached to the tire or the inside of a wheel of the tire so that information on air pressure and the like is timely transmitted to a vehicle body. The lithium primary battery according to the present embodiment can be preferably used as a power source for operating the sensor and/or transmitting sensor information.

Hereinafter, the configuration of the lithium primary battery according to one embodiment of the present invention will be more specifically described.

(Positive Electrode)

The positive electrode includes the positive electrode active material and the above-described fluorocarbon resin. The fluorocarbon resin is added to the positive electrode to substantially prevent a decrease in battery characteristics at high temperatures. The positive electrode may further include other substances (well-known substances to be used for positive electrodes of common lithium primary batteries). The positive electrode includes a binder (a binding agent) and a conductive agent. The binder may include a fluorocarbon resin without swellability, or the fluorocarbon resin with swellability may also serve as the binder.

Examples of the binder include fluorocarbon resins, such as polytetrafluoroethylene (PTFE), perfluoroalkoxy alkane (PFA), perfluoroethylene propylene copolymer (FEP), and ethylene-tetrafluoroethylene copolymer (ETFE). These binders do not substantially have swellability in the non-aqueous electrolyte used in the lithium primary battery, but, by using these binders, the strength of the positive electrode (the positive electrode pellet) can be enhanced. Examples of the binder to be used may further include rubber particles and acrylic resin. Examples of the conductive agent include carbon-based materials such as graphite and carbon black (for example, Ketchen black).

The mass of the binder included in the positive electrode may be in a range of 1.2% to 6% (for example, in a range of 1.5% to 3%) of the mass of the positive electrode active material included in the positive electrode. When the binder is included in the above-mentioned range, the positive electrode can be more easily formed, whereby, especially, mass production performance is increased. In the positive electrode, the mass ratio of the binder to the fluorocarbon resin with swellability in the electrolyte may be in a range of 1:0.1 to 1:3 (for example, in a range of 1:0.2 to 1:2).

Examples of the positive electrode active material included in the positive electrode include manganese dioxide. The positive electrode including manganese dioxide exhibits comparatively high voltage and has excellent pulse discharge characteristics. The manganese dioxide may be in mixed crystal form including two or more types of crystal forms. The positive electrode may include a manganese oxide other than manganese dioxide. Examples of the manganese oxide other than manganese dioxide include MnO, $Mn_3O_4$, $Mn_2O_3$, and $Mn_2O_7$. A main ingredient of manganese oxides included in the positive electrode is preferably manganese dioxide.

A part of the manganese dioxide included in the positive electrode may be doped with lithium. When the doping amount of lithium is small, high capacity can be secured. The manganese dioxide and the manganese dioxide doped with a small amount of lithium are expressed as $Li_xMnO_2$ ($0 \le x \le 0.05$). Note that an average composition of all the manganese oxides included in the positive electrode is beneficially $Li_xMnO_2$ ($0 \le x \le 0.05$). Note that the ratio x of Li usually increases when the discharge of the lithium primary battery proceeds. The ratio x of Li is beneficially 0.05 or lower when the lithium primary battery is in the initial discharge state.

The positive electrode can include other positive electrode active materials to be used for the lithium primary battery. Examples of the other positive electrode active materials include graphite fluoride. The ratio of $Li_xMnO_2$ may account for 90% by mass or higher of all the positive electrode active materials.

As the manganese dioxide, electrolytic manganese dioxide is preferably used. Electrolytic manganese dioxide having been subjected to at least any of neutralization, washing, and burning treatments may be used as necessary. Electrolytic manganese dioxide is usually obtained by the electrolysis of a manganese sulfate solution.

By adjusting the conditions of electrolytic synthesis, the degree of crystallinity of the manganese dioxide can be increased and the specific surface area of the electrolytic manganese dioxide can be reduced. The BET specific surface area of $Li_xMnO_2$ may be 10 $m^2/g$ or larger and 50 $m^2/g$ or smaller, and may be 10 $m^2/g$ or larger and 30 $m^2/g$ or smaller. The BET specific surface area of $Li_xMnO_2$ is beneficially measured by a well-known method, for example, measured by using a surface area measurement device (for example, manufactured by Mountech Co., Ltd.), based on a BET method. For example, $Li_xMnO_2$ separated from the positive electrode taken out from the battery is beneficially used as a measurement sample.

The average particle diameter (the median diameter D50) of $Li_xMnO_2$ serving as the positive electrode active material may be 20 to 40 μm, for example. From the viewpoint of substantially preventing a decrease in the characteristics at high temperatures, the ratio of the BET specific surface area ($m^2/g$) of $Li_xMnO_2$ serving as the positive electrode active material to the average particle diameter (μm) of $Li_xMnO_2$ may be 0.25 to 1.5.

The constituents (the negative electrode, the separator, the nonaqueous electrolyte, the case, and the like) other than the positive electrode are not particularly limited, and the battery may include a constituent (for example, a current collector) other than the above-mentioned constituents. As the constituents other than the positive electrode, well-known constituents to be used for common lithium primary batteries may be used. Hereinafter, examples of the constituents other than the positive electrode will be described below.

(Negative Electrode)

The negative electrode includes at least one selected from the group consisting of metal lithium and a lithium alloy, as a negative electrode active material. The negative electrode may include either metal lithium or the lithium alloy or may include both metal lithium and the lithium alloy. For example, a composite including metal lithium and the lithium alloy may be used for the negative electrode.

The lithium alloy is not particularly limited and can be an alloy used as a negative electrode active material of a lithium primary batteries. Examples of the lithium alloy include a Li—Al alloy, a Li—Sn alloy, a Li—Ni—Si alloy, and a Li—Pb alloy. From the viewpoints of providing a sufficient discharge capacity and stabilizing internal resistance, the content of metal elements other than lithium in the lithium alloy is preferably 0.05% to 15% by mass.

(Separator)

The lithium primary battery usually includes the separator interposed between the positive electrode and the negative electrode. As the separator, a porous sheet formed from an insulating material resistant to an internal environment of the lithium primary battery is beneficially used. Specific examples of the separator include a nonwoven fabric made of synthetic resin and a microporous film made of synthetic resin, and a laminate thereof.

Examples of the synthetic resin used for the nonwoven fabric include polypropylene, polyphenylene sulfide, and polybutylene terephthalate. Examples of the synthetic resin used for the microporous film include polyolefin resins, such as polyethylene, polypropylene, and an ethylene-propylene copolymer. The microporous film may include inorganic particles as necessary.

(Electrolyte)

The electrolyte is not particularly limited, and a nonaqueous electrolyte commonly used for lithium primary batteries may be used. Examples of the electrolyte that can be used include a nonaqueous electrolyte obtaining by dissolving a lithium salt or lithium ion in a nonaqueous solvent.

Examples of the nonaqueous solvent include an organic solvent commonly used for nonaqueous electrolytes of lithium primary batteries. Examples of the nonaqueous solvent include ether, ester, carbonic ester. Specific examples of the nonaqueous solvent that can be used include dimethyl ether, γ-butyrolactone, propylene carbonate, ethylene carbonate, and 1,2-dimethoxyethane. The nonaqueous electrolyte may include one of the nonaqueous solvents or may include two or more of the nonaqueous solvents.

From the viewpoint of enhancing the discharge characteristics of the lithium primary battery, the nonaqueous solvent preferably includes a cyclic carbonic acid ester having a high boiling point and a chain ether having a low viscosity even at low temperatures. The cyclic carbonic acid ester preferably includes at least one selected from the group consisting of propylene carbonate (PC) and ethylene carbonate (EC), and is particularly preferably PC. The chain ether preferably has a viscosity of 1 mPa·s or lower at 25° C., and particularly preferably includes dimethoxyethane (DME). Note that the viscosity of the nonaqueous solvent is measured at a temperature of 25° C. and a shear rate of 10,000 (1/s) by using a small sample viscometer, m-VROC, manufactured by Rheosense, Inc.

The nonaqueous electrolyte may include a lithium salt other than cyclic imide components. Examples of the lithium salt include a lithium salt used as a solute for lithium primary batteries. Specific examples of the lithium salt include $LiCF_3SO_3$, $LiN(CF_3SO_2)_2$, $LiClO_4$, $LiBF_4$, $LiPF_6$, $LiR_aSO_3$ ($R_a$ represents a $C_{1-4}$ fluoroalkyl group), $LiFSO_3$, $LiN(SO_2R_b)(SO_2R_c)$ ($R_b$ and $R_c$ are each independently a $C_{1-4}$ fluoroalkyl group), $LiN(FSO_2)_2$, $LiPO_2F_2$, $LiB(C_2O_4)_2$, and $LiBF_2(C_2O_4)$. The nonaqueous electrolyte may include one of these lithium salts or may include two or more of them.

The concentration of the lithium ions contained in the electrolyte (the total concentration of the lithium salts) is, for example, 0.2 to 2.0 mol/L, and may be 0.3 to 1.5 mol/L.

The electrolyte may include additives as necessary. Examples of the additives include propane sultone and vinylene carbonate. The total concentration of the additives included in the nonaqueous electrolyte is 0.003 to 5 mol/L, for example.

The positive electrode case can be formed of conductive stainless steel, for example.

The cross-sectional view of FIG. 1 illustrates the configuration of an example of the (coin or button-type) lithium primary battery according to the present embodiment. Lithium primary battery 10 illustrated in FIG. 1 includes positive electrode 11, separator 12, negative electrode 13, and case 20. Case 20 includes: positive electrode case 21 configured to function as a positive electrode terminal; sealing plate 22 configured to function as a negative electrode terminal; and gasket 23 disposed between positive electrode case 21 and sealing plate 22. Positive electrode 11 and negative electrode 13 face each other across separator 12. Positive electrode 11 includes the positive electrode active material and the fluorocarbon resin (not illustrated). The fluorocarbon resin is present in particulate form in the positive electrode.

Positive electrode 11, separator 12, negative electrode 13, gasket 23, and the nonaqueous electrolyte (not illustrated) are disposed between positive electrode case 21 and sealing plates 22, and positive electrode case 21 is sealed by inwardly bending and crimping an upper part of positive electrode case 21.

EXAMPLES

The lithium primary battery according to the present embodiment will be described in detail by using the following examples. However, the present invention is not limited to the following examples.

<<Batteries A1 to A6, B1 to B5>>

(1) Production of Positive Electrode

A positive electrode mixture was prepared by mixing electrolytic manganese dioxide, graphite (conductive agent), PVDF (fluorocarbon resin), and PTFE (having an average particle diameter of 0.25 μm) at a mass ratio of manganese-dioxide:graphite:PVDF:PTFE=100:5:2:2. In other words, the ratio of the PVDF included in the positive electrode mixture (positive electrode) was 2 parts by mass with respect to 100 parts by mass of the manganese dioxide (positive electrode active material).

As the PVDF, PVDF in a powder form, manufactured by SOLVAY, was used. The PVDF had a weight average molecular weight of 1,000,000. The value of the weight average molecular weight was a value measured by GPC. As the PVDF, what had average particle diameters (median diameters D50 on a volume basis) listed in Table 1 were used.

The above-described positive electrode mixture was molded into a disk-shaped pellet (positive electrode) having a diameter of 15 mm and a thickness of 2.0 mm. Thus, the disk-shaped positive electrode was formed.

(2) Production of Negative Electrode

From a metal lithium plate, a disk-shaped negative electrode having a diameter of 16 mm and a thickness of 1.0 mm was punched out.

(3) Preparation of Nonaqueous Electrolyte

A nonaqueous solvent was obtained by mixing propylene carbonate (PC) and 1,2-dimethoxyethane (DME) at a volume ratio of 1:1. Lithium perchlorate ($LiClO_4$) was dissolved in the nonaqueous solvent so as to achieve a concentration of 0.5 mol/L, whereby a nonaqueous electrolyte was prepared.

(4) Assembly of Lithium Primary Battery

A nonwoven fabric (having a thickness of 0.5 mm) made from polyphenylene sulfide was prepared as a separator. A gasket made from polyphenylene sulfide was prepared. A positive electrode case formed by pressing conductive stainless steel having a plate thickness of 0.25 mm was prepared. A sealing plate formed by pressing conductive stainless steel having a plate thickness of 0.20 mm was prepared. The positive electrode, the negative electrode, the electrolyte, the separator, the positive electrode case, the gasket, and the sealing plate were assembled into a flat lithium primary battery (having a diameter of 20 mm and a thickness of 3 mm) having a structure illustrated in FIG. 1.

By changing the average particle diameter of the PVDF as the fluorocarbon resin in the preparation of the positive electrode mixture, two or more types of lithium primary batteries A1 to A6 and B1 to B5 were produced, and evaluated as follows.

(5) Evaluation

[Measurement of Discharge Characteristics After High Temperature Storage Test]

The manufactured lithium primary batteries were put in an environment with a temperature of 125° C. Subsequently, discharge is performed at 125° C. under predetermined conditions, and discharge time elapsed before the discharge voltage of the battery reached 2.0 V was measured. The discharge was performed by repeated cycles of 100-msec discharge at 8 mA and 10-sec no discharge.

[Measurement of Particle Diameter of Fluorocarbon Resin]

Two of the manufactured lithium primary batteries were prepared, and put in a 25° C. environment for 2 hours. Subsequently, one of the batteries was subjected to the following measurement, meanwhile the other one of the batteries was put in an environment with a temperature of 125° C. for 100 hours (high temperature storage test).

A positive electrode was taken out from the one lithium primary battery not having been subjected to the high temperature storage test. A cross-section of the positive electrode was subjected to microscopic Raman spectroscopy, and from a region in which a dispersion peak derived from PVDF was detected, a grain boundary of particles of the PVDF was identified. Any ten PVDF-particles were chosen, and for each of the PVDF particles, an area of a region occupied by PVDF in a cross-section of the particle was determined, and the diameter of a circle (an equivalent circle) having the same area as the determined area was calculated as the particle diameter of the particle. The average of the calculated particle diameters of the PVDF particles was determined, and this average was regarded as a particle diameter d1 of the fluorocarbon resin before the high temperature storage test.

A positive electrode was taken out from the other lithium primary battery having been subjected to the high temperature storage test. A cross-section of the positive electrode was subjected to microscopic Raman spectroscopy, and, as in the case of the one lithium primary battery, the average of the particle diameters of PVDF particles was determined. This average was regarded as a particle diameter d2 of the fluorocarbon resin after the high temperature storage test.

<<Battery A7>>

Lithium primary battery A7 was produced and evaluated in the same manner as for battery A4, except that, in the preparation of the positive electrode mixture, the content of the PVDF in the positive electrode mixture (positive electrode) was 0.2 parts by mass with respect to 100 parts by mass of manganese dioxide (positive electrode active material).

<<Battery A8>>

Lithium primary battery A8 was produced and evaluated in the same manner as for battery A4, except that, in the preparation of the positive electrode mixture, the content of the PVDF in the positive electrode mixture (positive electrode) was 6 parts by mass with respect to 100 parts by mass of manganese dioxide (positive electrode active material).

Table 1 illustrates evaluation results. Table 1 illustrates the particle diameter d1 of the fluorocarbon resin before the high temperature storage test, the particle diameter d2 of the fluorocarbon resin after the high temperature storage test, the ratio d2/d1, moldability of the positive electrode mixture, and discharge time at 125° C. Furthermore, Table 1 illustrates the average particle diameter and the content (part by mass with respect to 100 parts by mass of the positive electrode active material) of the fluorocarbon resin mixed in the positive electrode mixture.

In Table 1, "moldable" in the item "moldability" means that the molding of a pellet was performed without a problem. In contrast, "not moldable" in the item "moldability" means that a pellet was broken during the molding.

In Table 1, lithium primary batteries A1 to A8 were Examples, meanwhile lithium primary batteries B1 to B5 were Comparative Examples.

TABLE 1

| Battery | Fluorocarbon resin part by mass with respect to 100 parts by mass of positive electrode active material | Fluorocarbon resin Average particle diameter (D50) (μm) | Particle diameter d1 before high temperature storage test (μm) | Particle diameter d2 after high temperature storage test (μm) | d2/d1 | Moldability | Discharge time (h) |
|---|---|---|---|---|---|---|---|
| B1 | 2.0 | 0.1 | — | — | — | moldable | 177 |
| B2 | 2.0 | 0.2 | — | — | — | moldable | 203 |
| B3 | 2.0 | 1 | 0.9 | 3.9 | 4.3 | moldable | 196 |
| B4 | 2.0 | 5 | 5.2 | 19 | 3.7 | moldable | 345 |
| A1 | 2.0 | 10 | 9.7 | 30 | 3.1 | moldable | 535 |
| A2 | 2.0 | 30 | 27 | 64 | 2.4 | moldable | 610 |
| A3 | 2.0 | 70 | 74 | 151 | 2.0 | moldable | 870 |
| A4 | 2.0 | 100 | 103 | 219 | 2.1 | moldable | 1013 |
| A5 | 2.0 | 140 | 142 | 236 | 1.7 | moldable | 1087 |
| A6 | 2.0 | 200 | 215 | 315 | 1.5 | moldable | 840 |
| A7 | 0.2 | 100 | 107 | 234 | 2.2 | moldable | 613 |
| A8 | 6.0 | 100 | 96 | 185 | 1.9 | moldable | 750 |
| B5 | 2.0 | 300 | — | — | — | not moldable | — |

Table 1 revealed that, in lithium primary batteries A1 to A8 including their respective positive electrodes each obtained by mixing a fluorocarbon resin having an average particle diameter (D50) of 10 to 200 μm with a positive electrode mixture to form a positive electrode active material in which the content of the fluorocarbon resin is in range of 0.2 to 6 parts by mass with respect to 100 parts by mass of the positive electrode active material, a decrease in battery characteristics at high temperatures was substantially prevented, and discharge lasted for 500 hours or longer. In addition, in lithium primary batteries A2 to A8 including their respective fluorocarbon resins each having an average particle diameter (D50) of 30 to 200 μm, discharge lasted for 600 hours or longer. In lithium primary batteries A3 to A8 including their respective fluorocarbon resins each having an average particle diameter (D50) of 70 to 200 μm, discharge lasted for 800 hours or longer.

Furthermore, Table 1 revealed that, when the average particle diameter (D50) of the fluorocarbon resin in the positive electrode mixture was larger, the ratio d2/d1 was lower. When the d2/d1 was 1.5 or higher and 3.1 or lower, a decrease in the battery characteristic at high temperatures was substantially prevented.

In lithium primary batteries B1 to B3 including their respective fluorocarbon resins each having an average particle diameter (D50) of 1 μm or smaller in the positive electrode mixture, discharge characteristics at high temperatures remarkably decreased. In lithium primary batteries B1 and B2, grain boundaries of their respective fluorocarbon resins were not identified in cross-sections of their respective positive electrodes, and d1 and d2 were not able to be calculated. However, from the fact that the detection limit of a Raman microscope is approximately 1 μm, both d1 and d2 in batteries B1 and B2 were estimated to be 1 μm or smaller.

In lithium primary battery B5 in which the fluorocarbon resin in the positive electrode mixture had an average particle diameter (D50) of 300 μm, the positive electrode was not molded into a pellet, and hence, lithium primary battery B did not function as a battery.

INDUSTRIAL APPLICABILITY

The present invention is applicable to a flat lithium primary battery.

REFERENCE MARKS IN THE DRAWINGS

10 . . . flat lithium primary battery
11 . . . positive electrode
12 . . . separator
13 . . . negative electrode
20 . . . case
21 . . . positive electrode case
22 . . . sealing plate
23 . . . gasket

What is claimed is:

1. A flat lithium primary battery, comprising:
a case;
a positive electrode;
a negative electrode;
a separator; and
a nonaqueous electrolyte,
the positive electrode, the negative electrode, the separator, and the nonaqueous electrolyte being disposed in the case,
wherein the positive electrode includes:
a positive electrode active material; and
a fluorocarbon resin with swellability in the nonaqueous electrolyte,
wherein, in the positive electrode, the fluorocarbon resin is in particulate form, and
wherein, when, on the flat lithium primary battery in an environment with a temperature of 25° C., a high temperature storage test to store the flat lithium primary battery in an environment with a temperature of 125° C. for 100 hours is conducted, a ratio d2/d1 of a particle diameter d2 of the fluorocarbon resin after the high temperature storage test to a particle diameter d1 of the fluorocarbon resin before the high temperature storage test is 1.5 or higher and 3.1 or lower.

2. The flat lithium primary battery according to claim 1, wherein the fluorocarbon resin is polyvinylidene fluoride.

3. The flat lithium primary battery according to claim 1, wherein a ratio A/B of a BET specific surface area A ($m^2/g$) of the positive electrode active material to an average particle diameter B (μm) of the positive electrode active material is in a range of 0.25 to 1.5.

4. The flat lithium primary battery according to claim 1, wherein the case includes:

a positive electrode case configured to function as a positive electrode terminal;

a sealing plate configured to function as a negative electrode terminal; and a gasket disposed between the positive electrode case and the sealing plate, and wherein the gasket includes polyphenylene sulfide.

5. The flat lithium primary battery according to claim 1, wherein the nonaqueous electrolyte includes dimethoxyethane as a solvent, and wherein the dimethoxyethane accounts for 50% by volume or higher of all solvents in the nonaqueous electrolyte.

6. The flat lithium primary battery according to claim 1, the flat lithium primary battery being a coin-type battery to be installed in a tire.

* * * * *